(12) United States Patent
Aharoni et al.

(10) Patent No.: US 8,479,178 B2
(45) Date of Patent: Jul. 2, 2013

(54) COMPILER IN A MANAGED APPLICATION CONTEXT

(75) Inventors: Avner Y. Aharoni, Seattle, WA (US);
Henricus Johannes Maria Meijer, Mercer Island, WA (US); Timothy Yat Tim Ng, Bellevue, WA (US); Amanda K. Silver, Seattle, WA (US); Scott Daniel Wisniewski, Mercer Island, WA (US); Kevin Wagner Halverson, Seattle, WA (US); David N. Schach, Redmond, WA (US); Aleksey V. Tsingauz, Seattle, WA (US); Paul A. Vick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1405 days.

(21) Appl. No.: 12/163,763

(22) Filed: Jun. 27, 2008

(65) Prior Publication Data

US 2009/0328012 A1    Dec. 31, 2009

(51) Int. Cl.
*G06F 9/45*        (2006.01)
*G06F 9/445*       (2006.01)

(52) U.S. Cl.
USPC .............................................. 717/148; 718/1

(58) Field of Classification Search
USPC ....................................................... 717/148
See application file for complete search history.

(56) References Cited

U.S. PATENT DOCUMENTS

| | | | |
|---|---|---|---|
| 6,256,784 B1 * | 7/2001 | Grove | 717/139 |
| 6,907,519 B2 | 6/2005 | Desoli | |
| 7,127,707 B1 | 10/2006 | Mishra et al. | |
| 7,219,329 B2 | 5/2007 | Meijer et al. | |
| 7,493,605 B2 * | 2/2009 | Alaluf et al. | 717/148 |
| 2002/0104076 A1 * | 8/2002 | Shaylor | 717/148 |
| 2002/0144241 A1 * | 10/2002 | Lueh | 717/136 |
| 2004/0255268 A1 * | 12/2004 | Meijer et al. | 717/106 |
| 2005/0137822 A1 * | 6/2005 | Burch et al. | 702/127 |
| 2005/0188382 A1 | 8/2005 | Nagendra et al. | |
| 2006/0190935 A1 | 8/2006 | Kielstra et al. | |
| 2006/0225033 A1 | 10/2006 | Ye et al. | |
| 2006/0225059 A1 * | 10/2006 | Plaxton et al. | 717/148 |
| 2007/0039010 A1 | 2/2007 | Gadre | |
| 2007/0089090 A1 | 4/2007 | Riedl et al. | |
| 2007/0294679 A1 | 12/2007 | Bobrovsky et al. | |

OTHER PUBLICATIONS

Gentile, "Introduction to Managed C++", Jan. 13, 2003, O'Reilly ONDotnet.com, accessed Sep. 5, 2012 at http://ondotnet.com/pub/a/dotnet/2003/01/13/intromcpp.html.*
Parmar. Understanding .NET Framework at a Glance, posted Jun. 7, 2004. http://www.codeproject.com/KB/dotnet/DotNetWhitePaper.aspx. Last accessed May 1, 2008, 8 pages.
Egger. The Importance of the Managed Platform http://www.codemagazine.com/Article.aspx?quickid=040073. Last accessed May 1, 2008, 4 pages.
Application Development http://msdn.microsoft.com/en-us/embedded/aa714498.aspx. Last accessed May 1, 2008, 3 pages.

* cited by examiner

*Primary Examiner* — James D Rutten
(74) *Attorney, Agent, or Firm* — Workman Nydegger

(57) ABSTRACT

A batch compiler is employed to enable compilation of code provided at runtime. A managed application receives code during execution and invokes the compiler to transform the code to enable it to execute within the context of the receiving application. Among other things, employment of a batch compiler preserves investments made to such compilers while also opening up new scenarios in application scripting and/or hosting that are otherwise unavailable.

20 Claims, 13 Drawing Sheets

COMPILER IN A MANAGED APPLICATION CONTEXT

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer utilizing a programming language creates the instructions comprising a computer program. Typically, source code is specified or edited by a programmer manually and/or with help of an integrated development environment (IDE). By way of example, a programmer may choose to implement code utilizing an object-oriented programming language (e.g., C#, VB, Java . . . ) where programmatic logic is specified as interactions between instances of classes or objects, among other things. Subsequently, the source code can be compiled or otherwise transformed to facilitate execution by a computer or like device.

A compiler produces code for a specific target from source code. For example, some compilers transform source code into native code for execution by a specific machine. Other compilers generate intermediate code from source code. This intermediate code is subsequently interpreted dynamically at runtime or compiled just-in-time (JIT) to facilitate cross platform execution, for example. Compilers perform lexical, syntactic, and semantic analysis as well as code generation.

A lexer performs lexical analysis in accordance with a grammar of regular expressions, for example. Lexical analysis is a process of converting a sequence of characters into tokens based on a program language specification. The lexer can be organized as a scanner and tokenizer, although such functional boundaries are often blurred. In fact, a lexer can also be referred to as a scanner or a tokenizer. The scanner, typically a finite state machine, iterates over a sequence of input acceptable and potentially unacceptable characters. The tokenizer classifies portions of input into tokens or blocks of characters.

A parser performs syntactic analysis on sequence of tokens provided by the lexer, for example, in an attempt to determine structure in accordance with a formal language grammar. Typically, syntactic analysis is accomplished with reference to a grammar that recursively defines expressions. The result of such analysis is a parse tree representing the syntactic structure of a set of tokens.

Subsequently, semantic analysis is performed with respect to the parse tree by way of top-down (e.g., recursive decent parser, LL parser (Left-to-right, Leftmost derivation) . . . ) or bottom-up (e.g., precedence parser, LR parser (Left-to-Right, Rightmost derivation) . . . ) approach. Semantic analysis involves determining the meaning of the code and performing various checks such as type checks, among other things.

A code generator produces code in a target language as a function performed analysis. In one instance, the code generator can utilize a source code representation such as an in-memory parse tree or other structure and related metadata to produce code. Generated code can correspond to a sequence of machine language instructions or some intermediate code representation, among other things.

Compilers can produce managed, unmanaged, and/or native code. Managed code can take advantage of a number of services such as memory management and security provided by a runtime. In other words, the code is managed by the runtime. Often, intermediate language code is managed. Unmanaged code does not receive services from a runtime but rather requires explicit machine calls to afford similar functionality. Native code refers to managed or unmanaged machine code. In some contexts, native code is used as a synonym for unmanaged code that runs natively on a machine. In other contexts, however, the term refers to machine code output from a JIT compiler that executes in a runtime. Here, the code may be managed but it is also machine code rather than simply intermediate language code.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to dynamic employment of a compiler in a managed application contexts. Compilers conventionally transform source code to target machine code at compile time. Here, this compile time mechanism is employed at runtime. Further, it is utilized in the context of a managed application to enable receipt and subsequent execution of runtime provided code. Among other things, this enables preservation of investment in existing compilers while also opening up new scenarios in application scripting and/or hosting that may otherwise be unavailable.

In accordance with one aspect of the disclosure, systems and methods are provided for mapping between application runtime metadata and compiler metadata. In particular, runtime context information or metadata can be transformed into compiler constructs so as to allow a "compile-time" compiler to run as if runtime metadata were native data structures. Similarly, compiler representations can be transformed to runtime form to enable execution.

According to another aspect of the disclosure, the compiler can pull contextual information as needed to compile code. Conventionally, batch compilers operate by a push model in which all information required for compilation is provided up front. However, this can be inefficient and especially since compiled code in this context can simply refer to pieces or fragments of code.

In accordance with yet another aspect, the compiler can run continuously as a service, for example. In other words, each time code needs to be compiled the compiler need not be restarted and reinitialized. This service model then provides opportunities to employ caching including predictive caching to further improve compilation performance and efficiency.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to employment of a compiler in a managed application context are described in detail hereinafter. There are many instances in which it is desirous to compile a piece of code dynamically at runtime for execution within the context of an application. Conventionally, batch or other "compile-time" compilers cannot be employed dynamically since they require all files, references and the like up front and rely on heavy machinery to produce an assembly or executable in the end. In other words, they are designed to take a full source code program and turn it into machine executable code. However, such a compiler can in fact be made available at runtime for employment by an application to produce an executable from acquired code. Among other things, this can be accomplished by mapping between runtime and compile time constructs and pulling contextual information into the compiler as needed. As a result, investments in batch compilers can be preserved and new scenarios opened in application scripting and/or hosting that are otherwise unavailable.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
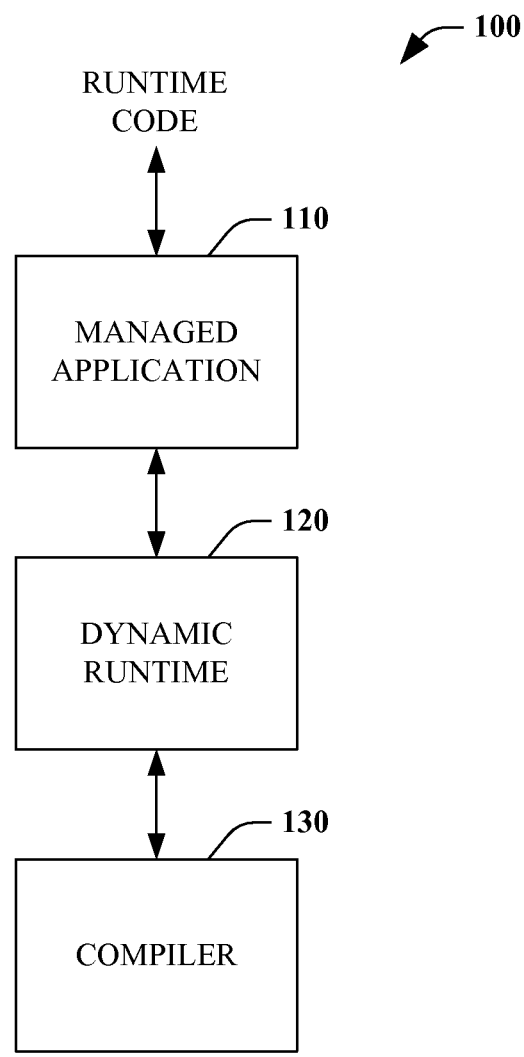
FIG. 1 is a block diagram of computer system in accordance with an aspect of the disclosed subject matter.

Referring initially to FIG. 1, a computer system 100 is illustrated in accordance with an aspect of the claimed subject matter. The system includes a managed application 110, dynamic runtime 120, and compiler 130 each of which is a component as that term is defined herein. The managed application 110 can correspond to an executable computer program that takes advantage of runtime services to facilitate programmability. In fact, such a program can be produced by a conventional compiler (e.g., command line compiler) from source code. Further, the managed application 110 can include functionality for receiving retrieving or otherwise acquiring code at runtime.

The dynamic runtime 120 provides various services to manage execution of an application. In accordance with one embodiment, the dynamic runtime 120 (also referred to as a dynamic language runtime) adds or supplements a common or other language runtime with dynamic services. A common language runtime provides shared services for programs specified in a plurality of different program languages (e.g., Visual Basic, C++, C# . . . ) including, without limitation, garbage collection, and security. Among other advantages, such shared services reduce the burden on programmers, facilitate seamless integration across different languages, and promote building upon previous work. While a common language runtime can include dynamic support, the dynamic runtime can add features to improve support for needs of dynamic languages (e.g., Python, Ruby . . . ). For example, the dynamic runtime can include a dynamic type system and facilities for rapid code generation.

The compiler 130 is a component that transforms source code into target or native machine code. For example, the compiler 130 can correspond to a conventional command line or batch compiler utilized to generate a program for execution on a particular computer or machine. Here, however, the compiler 130 is employed indirectly by the managed application 110 and/or directly by the dynamic runtime 120 and counter to its designed purpose to perform compilation at runtime.

By way of example, suppose the managed application is a database application that generates reports. These reports can allow functionality to be added thereto by accepting expressions or code from outside the application by way of an interface (e.g., graphical user interface (GUI), user interface (UI) . . . ). In this situation, the compiler 130 can be utilized to compile any runtime code received by the application such that it can be employed within the context of the reporting application. Accordingly, the compiler 130 can be utilized to generate executable code at compile time and the same functionality can be leveraged at runtime to compile received code. Moreover, the application can be provided in one program language and the runtime code in a different language. Multiple compilers can also be utilized to enable runtime compilation of many different languages.

It is to be noted that although the compiler 130 can be employed to provide functionality similar to an interpreter, it is in fact not an interpreter. Interpreters perform code transformation at runtime to enable execution thereof. However, interpreters do not recognized differences between compile time and runtime, because there is only runtime. An interpreter runs provided source code immediately. By contrast, a compiler takes source code at compile time and turns it into target code that is executed at runtime. Accordingly, there is a phase distinction between compile time and runtime for a compiler.

Figure 2:
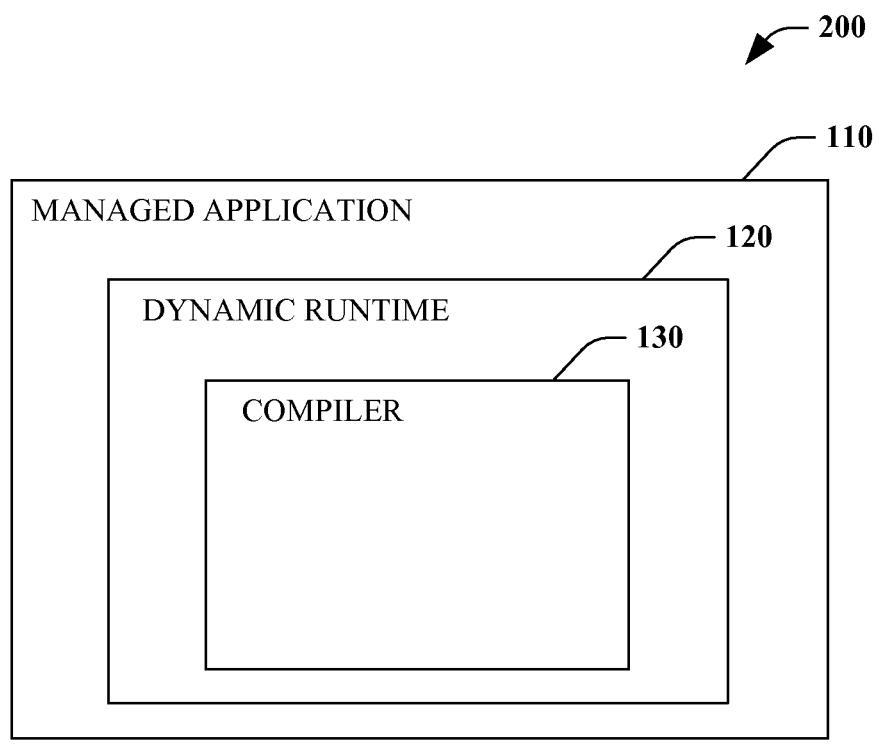
FIG. 2 is a block diagram of a hosted embodiment of the computer system of FIG. 1 according to a disclosed aspect.
Figure 3:
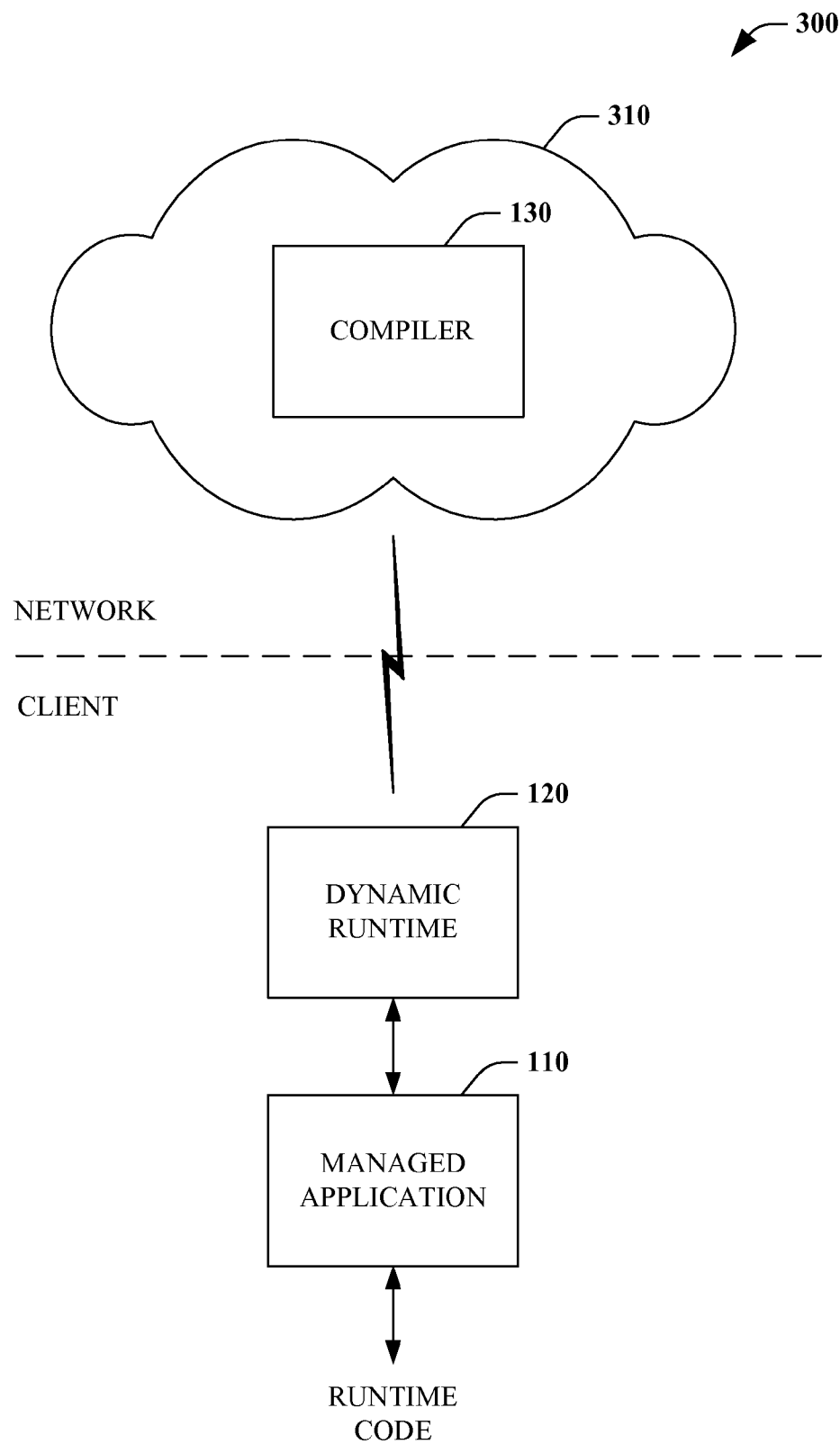
FIG. 3 is a block diagram of a distributed embodiment of the computer system of FIG. 1 in accordance with a disclosed aspect.

FIGS. 2 and 3 illustrate two exemplary embodiments of the system 100 in accordance with aspects of the claimed subject matter. Turning first to FIG. 2, a hosted embodiment 200 of system 100 is depicted. As illustrated, the managed application 110 acts as a host to both the dynamic runtime 120 and the compiler 130. Alternatively, the managed application 110 hosts or integrates the dynamic runtime 120, which in turn hosts the compiler. Interaction between a managed application 110 and a runtime such as the dynamic runtime 120 can occur in accordance with known techniques. Furthermore, the dynamic runtime 120 can define hosting interfaces that can be implemented with respect to the compiler 130 to enable the managed application 110 to interact with the compiler 130.

FIG. 3 depicts a hosted embodiment 300 of system 100 in accordance with an aspect of the claimed subject matter. Again, the managed application 110 can interact with the dynamic runtime 120 as previously described. Here, however, the compiler 130 can be pushed outside of the machine hosting the managed application 110 and dynamic runtime 120 to a network cloud 310. Stated differently, the compiler 130 can be decoupled from the application and operate as a network service. In this manner, upon receipt of code, an application 110 can directly or indirectly request an executable from the batch compiler 130 across a network. Among other things, the distributed embodiment 300 can helpful when dealing with thin devices or computers (e.g., mobile phones, personal digital assistants, palm top computers . . . ).

Figure 4:
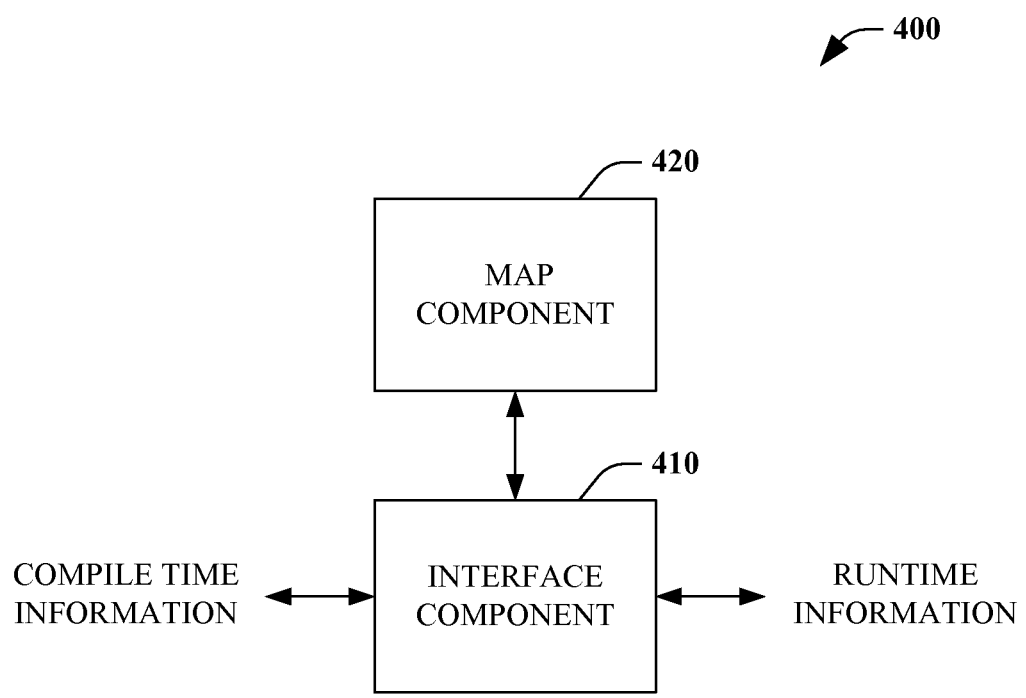
FIG. 4 is a block diagram of a metadata transformation system to facilitate compilation at runtime in accordance with an aspect of the disclosure.

Turning attention to FIG. 4, a metadata transformation system 400 is depicted in accordance with an aspect of the claimed subject matter. Similar information is utilized at compile time and runtime, but the representations of such information can be different. At both compile time and runtime metadata is available about a program, program state, values, etc. For example, variable type is often needed. A compiler has a representation of variables, where they are bound, in what class they are declared and so on. A runtime maintains similar information at runtime for the purpose of reflection, garbage collection, remoting, and other runtime services. As described herein, it is desirous to employ the compiler at runtime (as opposed or in addition to at compile time) to enable acquired code to be executed within the context of an application. Accordingly, runtime information or metadata needs to be transformed into compile time information or metadata to facilitate interoperation.

As shown, system 400 includes an interface component 410 that receives, retrieves, or otherwise obtains or acquires compile time or runtime information and returns opposite. In other words, if the interface component 410 acquires compile time information it returns runtime information and vice versa. The interface component 410 interacts with the map component 420 that performs the transformation between compile time and runtime information. Thus, the map component 420 affords a bridge between compile time and runtime worlds. For example, runtime metadata such as "System.Type," "System.Runtime.MethodInfo," "System.Runtime.PropertyInfo" can be mapped to compiler symbols.

Figure 5:
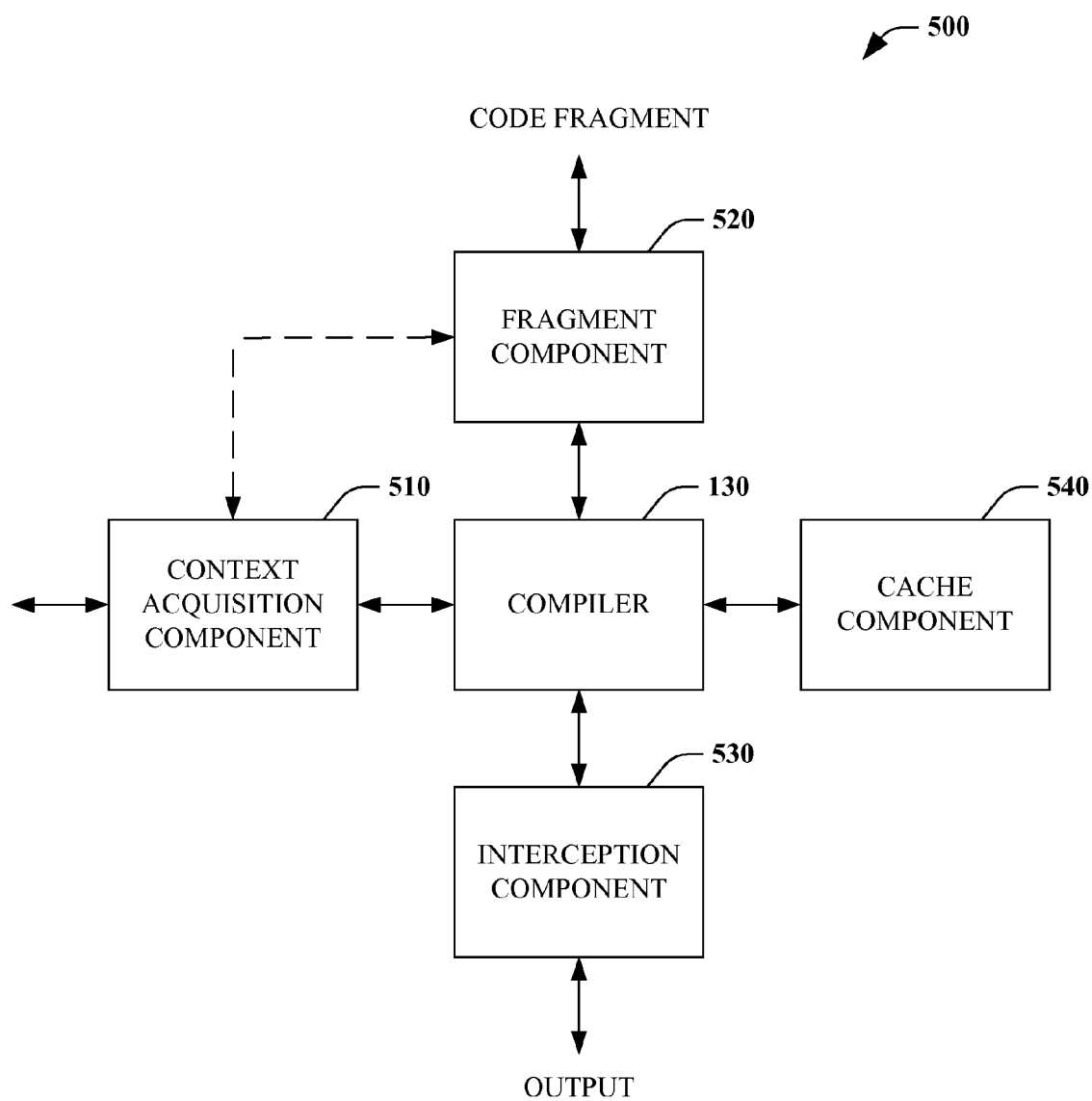
FIG. 5 is a block diagram of a runtime compilation system in accordance with a disclosed aspect.

Referring to FIG. 5, a runtime compilation system 500 is shown in accordance with a claimed aspect. The system 500 includes a batch compiler 130, as previously described. In brief, the compiler 130 is a mechanism for compiling or transforming source code into target machine code. The system 500 also includes a context acquisition component 510 communicatively coupled to the batch compiler 130.

Conventional compilers require all contextual information upfront or pushed thereto prior to compilation. In fact, such compilers assume that all information is available. This can be problematic when compiling code at runtime as the information may not be available. Context acquisition component 510 can acquire contextual information for the compiler 130. While all contextual information can be retrieved by the acquisition component 510, this can be inefficient. As a result, the context acquisition component 510 retrieves information lazily or as needed. In other words, compiler information (e.g., compiler symbol) can be pulled into the compiler as required to effect compilation.

It is to be appreciated that the compiler 130 can be employed to process code fragments. In traditional compilation, entire programs are compiled wherein the program includes all the language constructs dictated by a language grammar. Fragment component 520 can receive, retrieve, or otherwise obtain or acquire a code fragment and call the batch compiler 130 to process the fragment. The fragment component 520 can interact directly or indirectly with the context acquisition component 510 to pull in requisite context information or metadata to compile a fragment. As a result, a code fragment is not required to be a particular or typical compilation unit. Utilization of context acquisition component 510 to obtain required context enables compilation of arbitrary pieces of code, wherein missing context is obtained to make compilation complete. By way of example, consider a method. It can refer to a number of fields because the method is defined in a class. This context information or metadata can be retrieved to enable execution of the method.

The system 500 additionally includes interception component 530 that intercepts intermediate representations of compiler output. Traditionally, compilers produce as output an assembly or complete executable program. Here, the output should be smaller than a complete program as only portions of executable code, among other things, need to be compiled at runtime. The interception component 530 can intercept intermediate compiler representations such as expressions trees, which are representations of expressions. Thus, the output is an intermediate representation that an application can cache and/or execute among other things.

Additionally, system 500 can include a cache component 510 to facilitate caching and employment of compilation information. In accordance with on aspect of the disclosure, the batch compiler 130 can be operated as a continually running service to process multiple invocations In this case, there is an opportunity to improve performance by caching information/data that is likely to be employed again with respect to subsequent compilations. For instance, where an expression is provided twice for compilation, compiler 130 can immediately return a cached compiled version rather than performing duplicative work. Initial tests show caching affords a substantial performance improvement over systems where a compiler has to be instantiated and reloaded with metadata upon every invocation. It should further be appreciated that the cache component 510 can enable predicative caching. By way of example, inferences can be made about the kind of programming being done and the cache component 510 can initiate retrieval of appropriate metadata, compilation, and caching of data/information for subsequent use.

Note the functionality associated with the context acquisition component 510, fragment component 520, interception component 530, and cache component 540 need not affect processing by the batch compiler 130. In fact, modification of the compiler 130 can potentially introduce bugs, semantic changes, or other problems. Accordingly, additional functionality can be introduced by way of code injection mechanisms known in the art such as those pertaining to code instrumentation. For example, a wrapper or adapter design pattern can be employed with respect to compiler to afford additional functionality. In other words, the context acquisition component 510 and interception component 520 can interface with batch compiler 130 without changing compilation logic.

Figure 6:
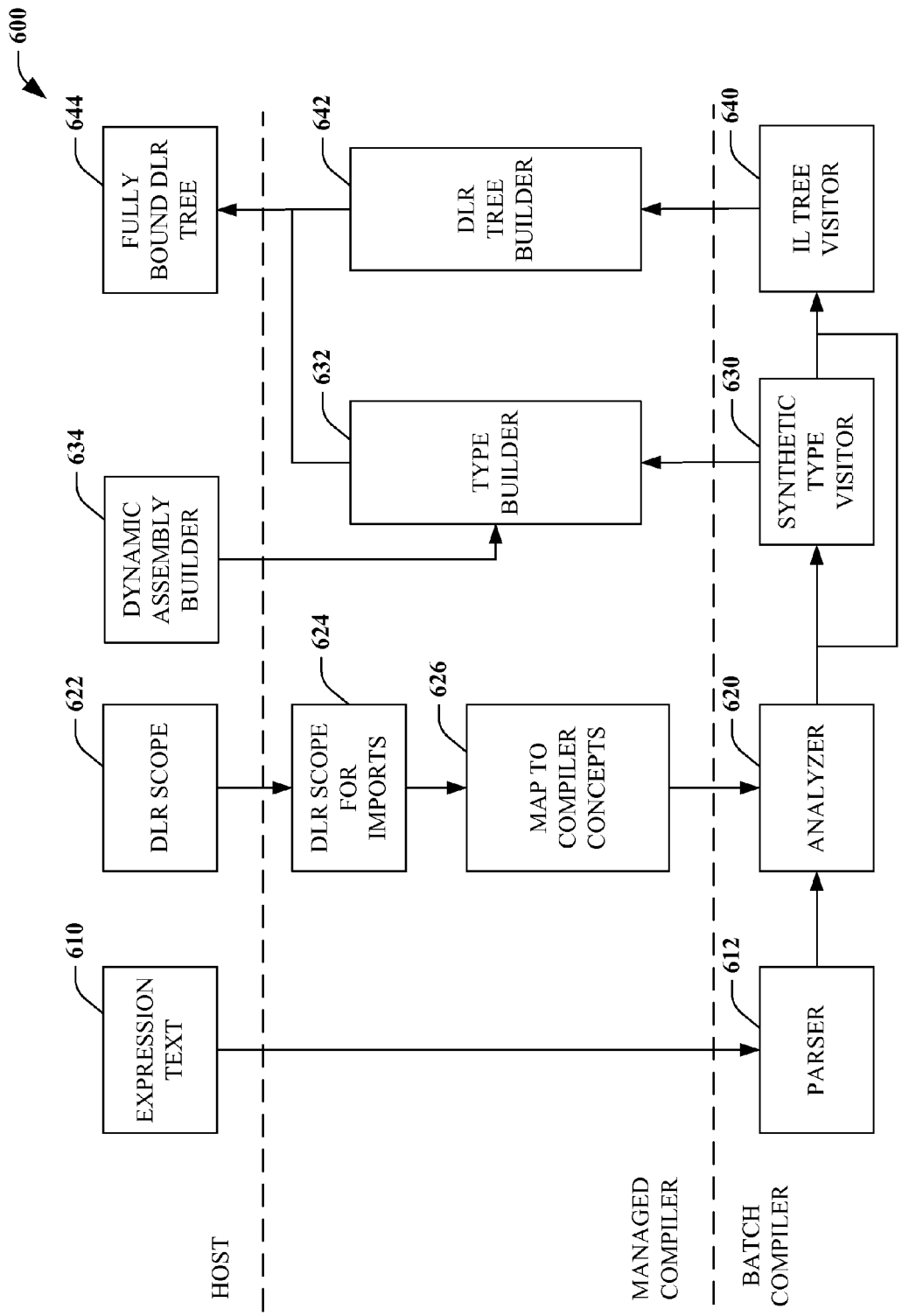
FIG. 6 is a block diagram of an exemplary compilation system according to an aspect of the disclosure.

Referring to FIG. 6, a compilation system 600 is depicted in accordance with an aspect of the claimed subject matter. The compilation system 600 includes a plurality of components segmented into host, batch compiler and managed compiler. The host portion refers to an application that receives code for compilation by a hosted compiler. The managed compiler portion refers a batch compiler adapted to perform runtime compilation for an application. Expression text 610 is provided to parser 612 and an analyzer 620, together forming a conventional compiler, for compilation. Dynamic language runtime (DLR) scope 622 refers to the scope of an application managed by a dynamic language runtime including application construct names, values and types (e.g., hash table), among other things. DLR scope of imports 624 pertains to the same information for external applications, libraries, or portions thereof employed by the host application. At 624, such application and/or runtime concepts are mapped to compiler concepts. Synthetic type visitor 630 extracts synthetic or compiler types rather than application generated types (e.g., anonymous types, closures, lambda expressions . . . ) and provides them to type builder 632. The type builder 632 employs dynamic assembly builder 634 to create managed type representations of compiler types. Intermediate language (IL) tree visitor 640 intercepts an intermediate representation of compiler output, referred to as IL tree, and provides it to DLR tree builder 642, which constructs a fully bound tree 644, from the IL tree and the managed type representations from the type builder 644.

The following is an exemplary code that shows how a compiler can be used within an application:

```
Dim _compiler As New Compiler( )
'Add assembly references
_compiler.AddAssemblyReference("System.dll")
_compiler.AddAssemblyReference("System.Core.dll")
_compiler.AddAssemblyReference("System.Forms.dll")
'Add namespaces to scope
Dim importScope As New ImportScope( )
importScope.AddImport("System.Linq")
importScope.AddImport("System.Collections.Generic")
importScope.AddImport("System.Forms")
importScope.AddImport(GetType(Diagnostics.Process))
importScope.AddImport(GetType(Color))
'Some code coming from the host application for example code written
in a text box
Dim code = vb.GetSelectedText( )
Dim localScope = vb.Compiler.CreateLocalsScope( )
localScope.Parent = importScope
'Pass the host applciation instance (with its full object model)
localScope.DeclareVariable("app", Me, GetType(Form1))
Dim expr = vb.Compiler.ParseExpression(code, localScope)
'Get the results of executing the code
Dim results = expr.Evaluate( )
```

In particular, the code demonstrates how an application can provide data to a compiler to evaluate an expression and be able to execute it. The first portion is about adding references to the compiler and the second part adds scoping information. After the third comment, code is provided, namely "Dim code=vb.GetSelectedText( )", that acquires text from a text box, for example. This is the mechanism for obtaining text or code for compilation. Subsequently, a compiler is created with appropriate scope and instructed to compile an expression. Next, the compiled expression is evaluated or otherwise executed in some manner. It is to be appreciated that "GetSelectedText( )" and "ParseExpression (code, localScope)" can depend on the context or what the rest of code is doing. Context can be pulled in by these code segments such that when the expression text is compiled all required information is available.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the cache component 540 of FIG. 5 can employ such mechanisms to make decisions and/or inferences about caching and in particular to facilitate predictive caching.

In view of the exemplary systems described supra, methodologies that may be implemented in accordance with the disclosed subject matter will be better appreciated with reference to the flow charts of FIGS. 7-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
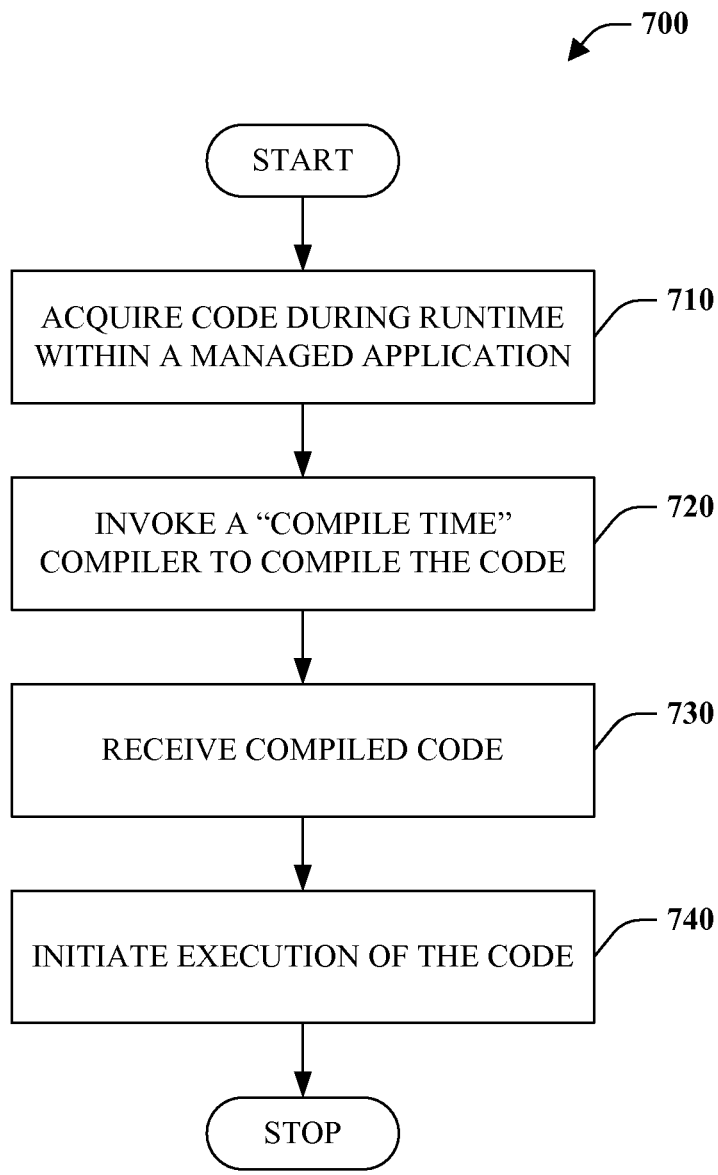
FIG. 7 is a flow chart diagram of a computer processing method in accordance with an aspect of the disclosure.

Referring to FIG. 7, a computer processing method 700 is depicted in accordance with an aspect of the claimed subject matter. At reference numeral 710, code is acquired by a managed application during runtime. For instance, an application can include a text box that receives expressions such as a recorded macro for a spreadsheet application. In a gaming situation, code can be accepted to control character actions, for example. At numeral 720, a batch or other "compile-time" compiler is invoked to compile the received code. The compiled code is received at 730 from the invoked compiler. At reference 740, execution of the compiled version of the code is initiated such as macro evaluation or character control.

Figure 8:
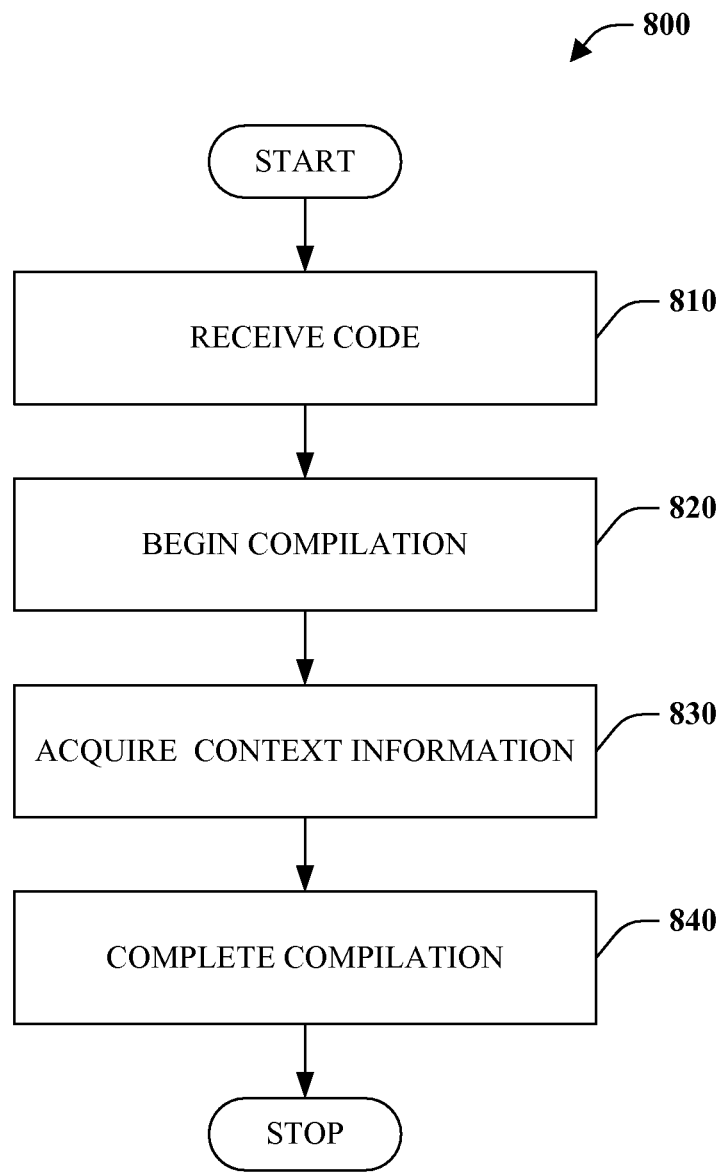
FIG. 8 is a flow chart diagram of a compilation method according to a disclosed aspect.

FIG. 8 is a flow chart diagram of a compilation method in accordance with an aspect of the claimed subject matter. At numeral 810, code is received from a managed application, for instance. Compilation of the code begins at reference numeral 820. As needed during compilation, context information is acquired at reference 830. For example, where the code is a fragment smaller than a normal compilation unit context information or metadata may be needed to make the fragment complete to enable compilation. At reference 840, compilation is completed based on the acquired context information.

Figure 9:
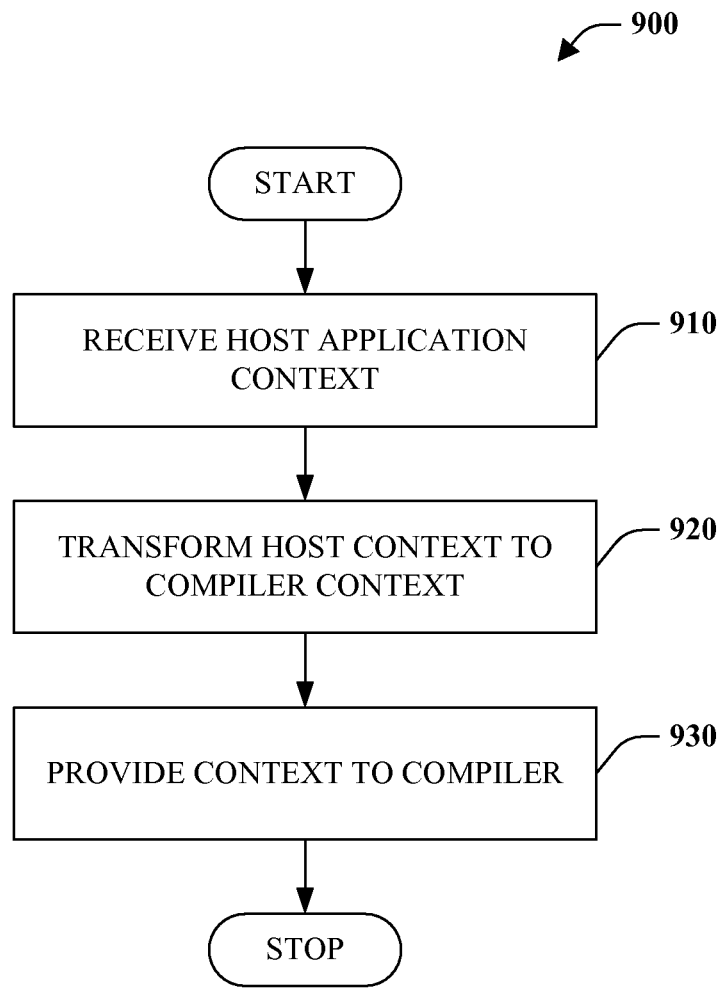
FIG. 9 is a flow chart diagram of a method of transforming compiler context information according to an aspect of the disclosure.

FIG. 9 depicts a method 900 of transforming application context information in accordance with an aspect of the claimed subject matter. At reference numeral 910, application context information is received. Such information can include current scope comprising programmatic constructs, names, values, and/or types, among other things. At numeral 920, the application context or metadata is transformed into a compiler context representation. For example, runtime type concepts can be mapped to compiler symbols. At reference numeral 930, the transformed context is provided to a batch compiler for utilization.

Figure 10:
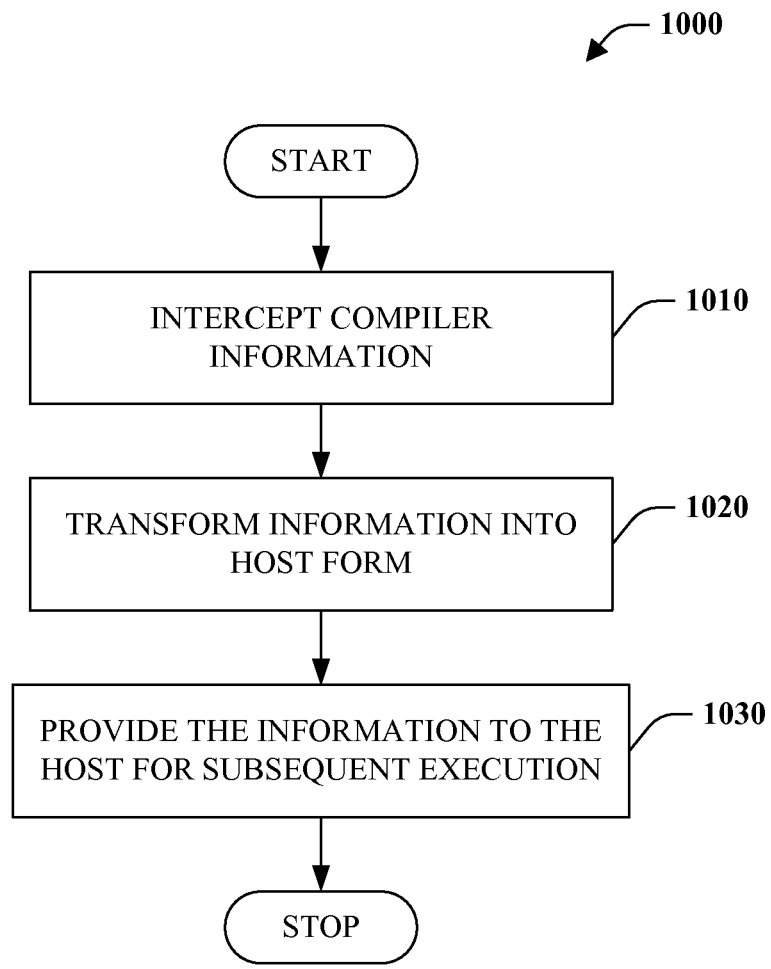
FIG. 10 is a flow chart diagram of a method of transforming compiler context information in accordance with an aspect of the disclosure.

FIG. 10 illustrates a method 1000 of transforming compiler information according to a claimed aspect. At reference numeral 1010, compiler information is intercepted. For instance, intermediate output representations can be captured from the compiler. At numeral 1020, the compiler information is transformed into application form such as but not limited to an expression tree. It should be appreciated that in accordance with one aspect, compiler generated types can be converted to application types utilizing an application mechanism, for instance, and inserted into an application representation such as an expression tree. The transformed information is provided to the application at reference numeral 1030 for subsequent execution, evaluation or the like.

Figure 11:
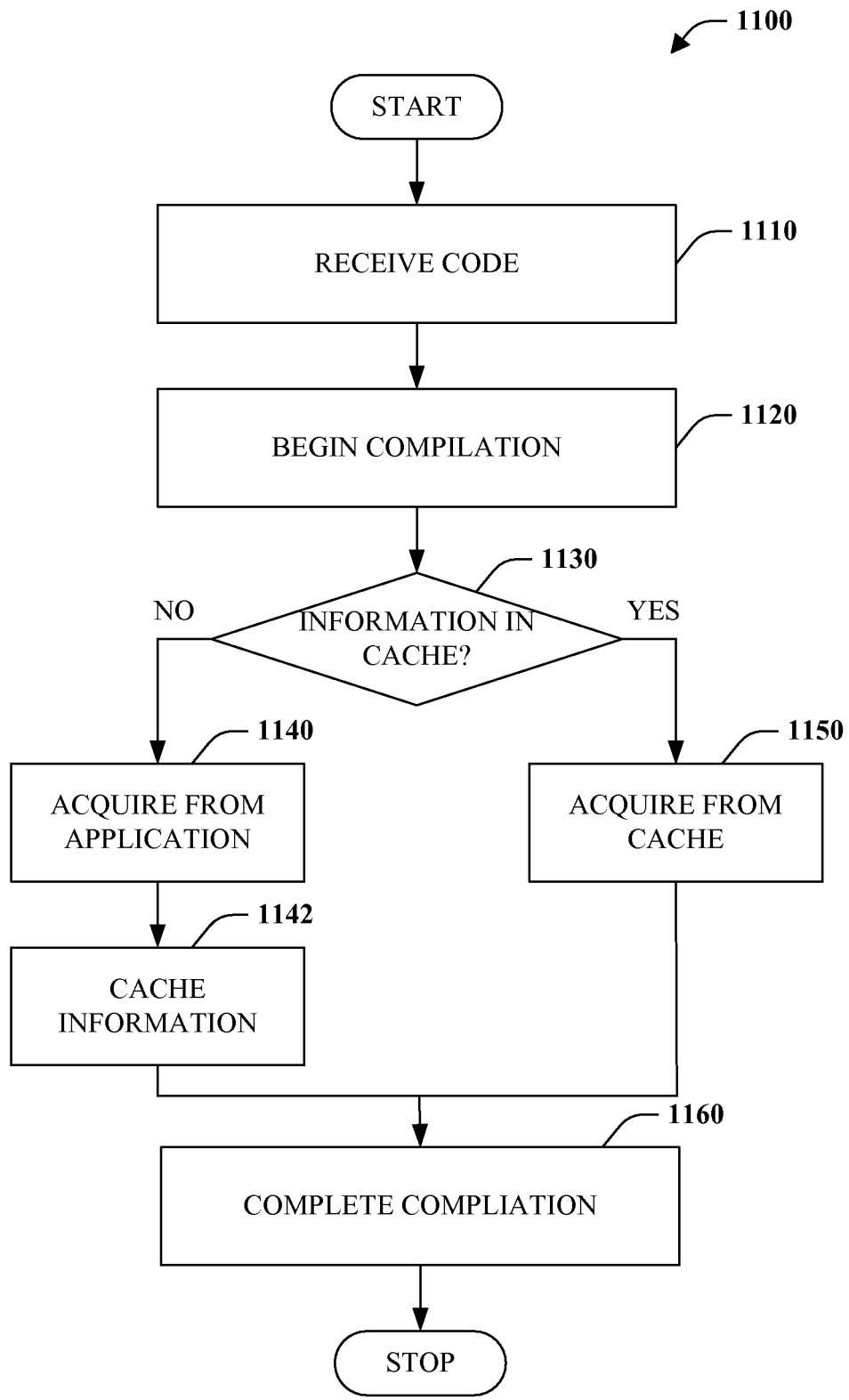
FIG. 11 is a flow chart diagram of a compilation method that employs caching according to a disclosed aspect.

FIG. 11 is a flow chart diagram of a compilation method 1100 utilizing caching according to a claimed aspect. At reference numeral 1110, code or other expression text is received, for instance from a managed application at runtime. At numeral 1120, compilation begins. During compilation, a determination is made, at 1130, concerning whether or not pertinent information is available in cache memory. If information is available ("YES"), the method continues at reference numeral 1150 where information is acquired from the cache. If such information is unavailable ("NO"), the method resumes at 1140 where such information is acquired from an application and/or associated runtime. Subsequently, the acquired information can be cached at 1142 to prevent duplicate work for later compilations. At numeral 1160, the code compilation is complete. In accordance with an aspect of the claims, it is to be noted that method 1100 can be a continuous compilation method or service that utilizes a batch compiler. In this manner, cached information can lead to substantial improvements in compilation speed and efficiency by avoiding duplicative processing.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
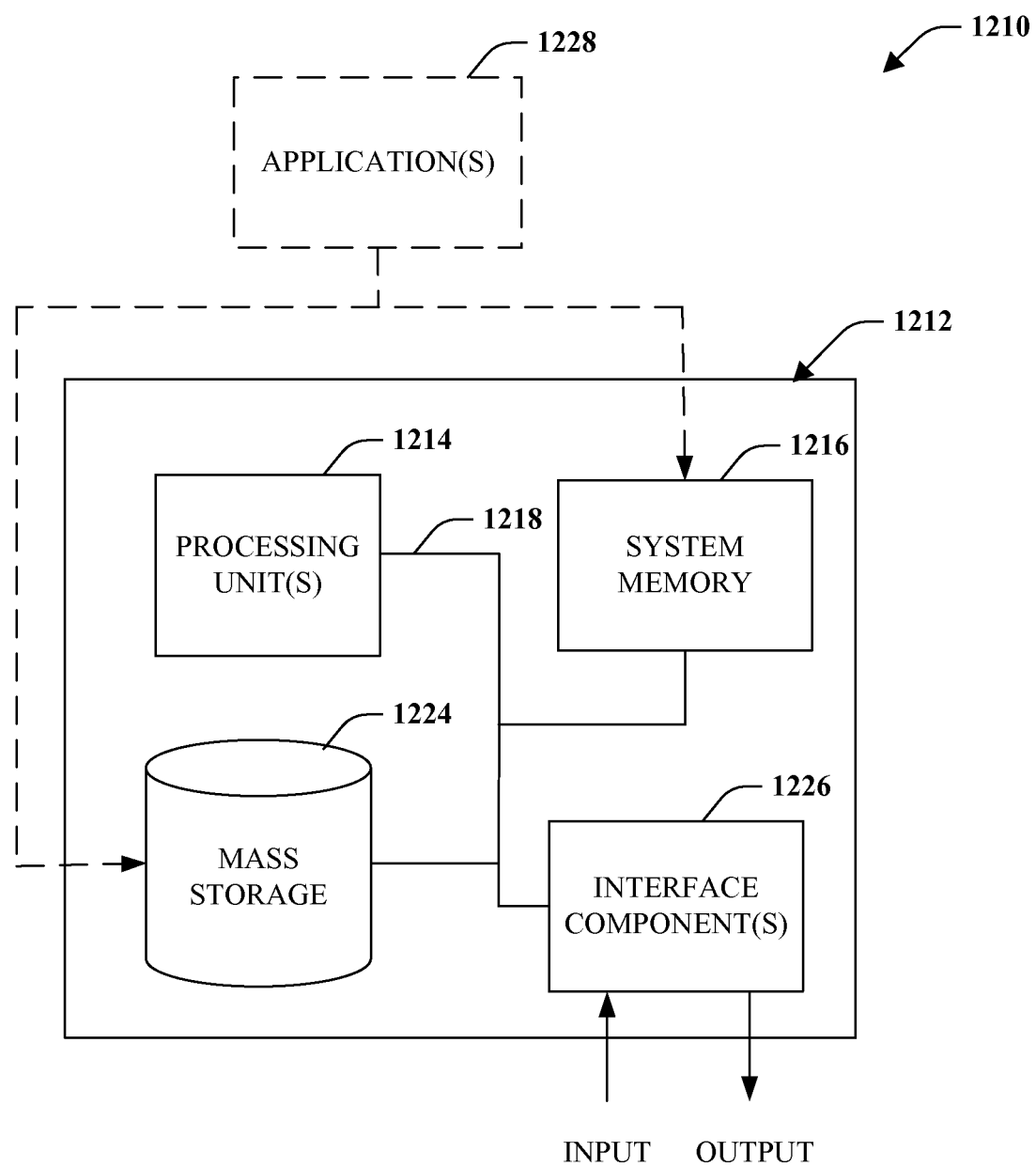
FIG. 12 is a schematic block diagram illustrating a suitable operating environment for aspects of the subject disclosure.
Figure 13:
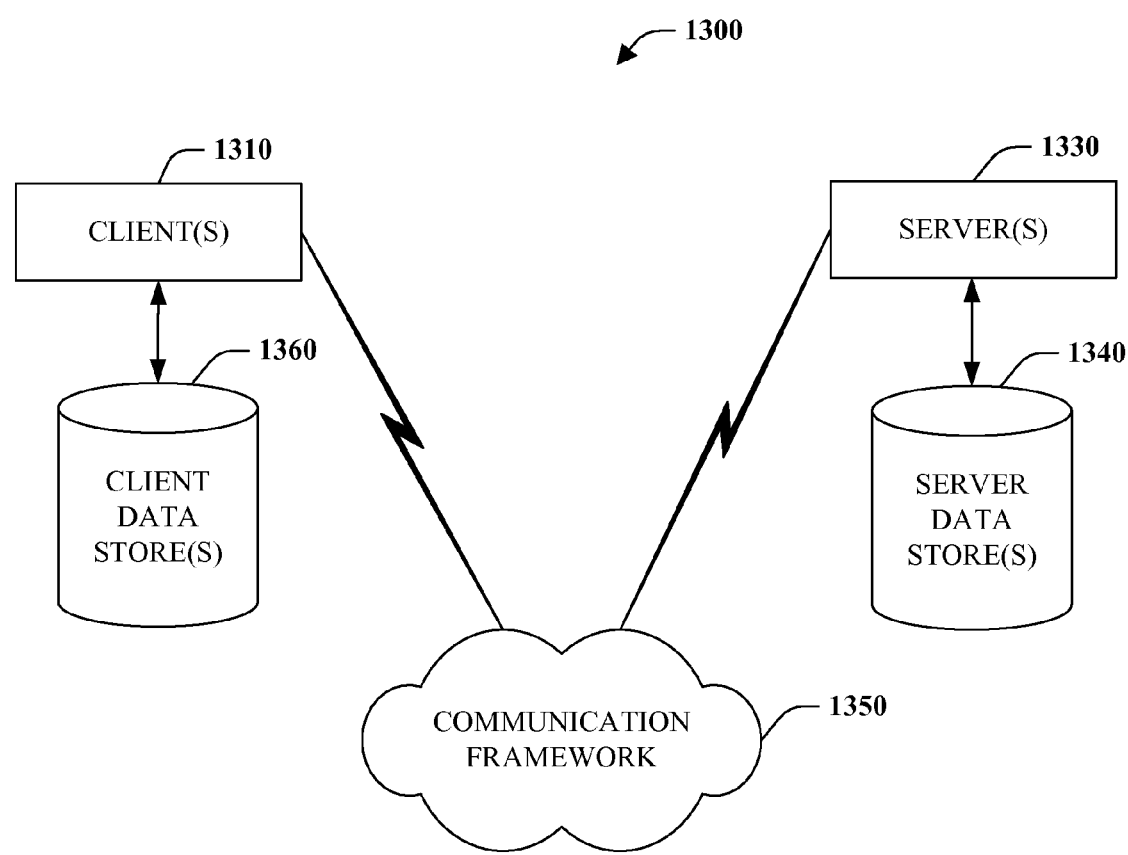
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory, or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1212 to output device(s) via interface component 1226. Output devices can include displays (e.g., CRT, LCD, plasma . . . ), speakers, printers and other computers, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

Client/server interactions can be utilized with respect to various aspects of the claimed subject matter. As previously mentioned and in accordance with one embodiment, a batch compiler can be deployed and employed as a network service. Accordingly, the service can be provided by one or more servers 1330 and accessed over the communication framework 1350 by one or more clients 1310 to enable runtime compilation of managed applications. By way of example, consider a client 1310 gaming system that accepts runtime code or the like. Any code can be compiled by a remote service provided by a server 1330 and optionally executed thereby as well. Thus, the service can be considered and execution engine service that accepts code at runtime.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer system, comprising:
   one or more processors; and
   one or more computer-readable storage media having stored thereon computer-executable instructions that, when executed by the one or more processors, cause the computer system to implement a method for compiling code at runtime, the method comprising:
   executing a managed application at the computer system; and
   during execution of the managed application at the computer system:
      acquiring code that is to be executed by and during runtime of the managed application;
      identifying a code fragment comprising a subset of the acquired code;
      identifying runtime metadata representing a current context of the managed application;
      mapping the runtime metadata to native compiler symbols of a compile-time compiler that is configured to generate native code;
      passing the native compiler symbols and the code fragment to the compile-time compiler for compilation of the code fragment within the context of the native compiler symbols;
      intercepting an intermediate representation of the code fragment from the compile-time compiler; and
      executing the intermediate representation of the code fragment within the managed application.

2. The computer system of claim 1, wherein a dynamic runtime component facilitates interaction between the managed application and the compile-time compiler.

3. The computer system of claim 2, wherein the dynamic runtime component enables hosting of the compile-time compiler within the managed application.

4. The computer system of claim 2, wherein the compile-time compiler executes as a network service.

5. The computer system of claim 1, wherein the compile-time compiler pulls context information from the managed application during compilation.

6. The computer system of claim 1, wherein the compile-time compiler transforms code without restarting.

7. The computer system of claim 1, further comprising a caching compiler context information.

8. The computer system of claim 7, wherein the compile-time compiler employs cached context information to enable expeditious compilation.

9. A method, implemented at a computer system that includes one or more processors for compiling code at runtime, the method comprising:
   executing a managed application at the computer system; and
   during execution of the managed application at the computer system:
   acquiring code that is to be executed by and during runtime of the managed application;
   identifying a code fragment comprising a subset of the acquired code;
   identifying runtime metadata representing a current context of the managed application;
   mapping the runtime metadata to native compiler symbols of a compile-time compiler that is configured to generate native code;
   passing the native compiler symbols and the code fragment to the compile-time compiler for compilation of the code fragment within the context of the native compiler symbols;
   intercepting an intermediate representation of the code fragment from the compile-time compiler; and
   executing the intermediate representation of the code fragment within the managed application.

10. The method of claim 9, further comprising pulling context information from the managed application as needed to transform the code.

11. The method of claim 9, wherein identifying a code fragment comprises identifying a code fragment of arbitrary size.

12. The method of claim 9, further comprising passing an additional code fragment to the compile-time compiler for compilation without restarting the compile-time compiler.

13. The method of claim 12, further comprising employing cached compilation information to expedite transformation.

14. The method of claim 9, wherein the code fragment represents an entire application program.

15. The method of claim 9, wherein the intermediate representation of the code fragment includes at least one expression tree.

16. The method of claim 9, wherein the runtime metadata representing a current context of the managed application includes scoping information.

17. The method of claim 9, wherein the runtime metadata representing a current context of the managed application includes reference information.

18. The method of claim 9, wherein the compile-time compiler is a command-line compiler.

19. The method of claim 9, wherein the compile-time compiler is a batch compiler.

20. A computer program product comprising one or more physical storage devices having stored thereon computer-executable instructions that, when executed by one or more processors of a computer system, cause the computer system to implement a method for compiling code at runtime, the method comprising:
   executing a managed application at the computer system; and
   during execution of the managed application at the computer system:
   acquiring code that is to be executed by and during runtime of the managed application;
   identifying a code fragment comprising a subset of the acquired code;
   identifying runtime metadata representing a current context of the managed application;
   mapping the runtime metadata to native compiler symbols of a compile-time compiler that is configured to generate native code;
   passing the native compiler symbols and the code fragment to the compile-time compiler for compilation of the code fragment within the context of the native compiler symbols;
   intercepting an intermediate representation of the code fragment from the compile-time compiler; and
   executing the intermediate representation of the code fragment within the managed application.

* * * * *